(12) United States Patent
Sekine et al.

(10) Patent No.: US 9,319,600 B2
(45) Date of Patent: Apr. 19, 2016

(54) INFORMATION PROCESSING APPARATUS, INFORMATION PROCESSING METHOD AND COMPUTER PROGRAM PRODUCT

(71) Applicant: KABUSHIKI KAISHA TOSHIBA, Tokyo (JP)

(72) Inventors: Masahiro Sekine, Fuchu (JP); Masashi Nishiyama, Kawasaki (JP); Kaoru Sugita, Iruma (JP); Hidetaka Ohira, Kawasaki (JP); Yusuke Tazoe, Kokubunji (JP); Goh Itoh, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 7 days.

(21) Appl. No.: 14/202,621

(22) Filed: Mar. 10, 2014

(65) Prior Publication Data

US 2014/0293092 A1 Oct. 2, 2014

(30) Foreign Application Priority Data

Apr. 2, 2013 (JP) .................................. 2013-076979

(51) Int. Cl.
| | | |
|---|---|---|
| *H04N 5/272* | (2006.01) | |
| *H04N 5/262* | (2006.01) | |
| *H04N 5/232* | (2006.01) | |
| *H04N 1/21* | (2006.01) | |

(52) U.S. Cl.
CPC ........... *H04N 5/272* (2013.01); *H04N 5/23293* (2013.01); *H04N 5/2621* (2013.01); *H04N 1/2112* (2013.01)

(58) Field of Classification Search
CPC . H04N 5/272; H04N 5/23293; H04N 5/2621; H04N 1/2112; G06F 17/30
USPC .............................................. 348/231.2, 239
See application file for complete search history.

(56) References Cited

U.S. PATENT DOCUMENTS

| | | | | |
|---|---|---|---|---|
| 2009/0003797 | A1* | 1/2009 | Nash | ................................ 386/95 |
| 2011/0016150 | A1* | 1/2011 | Engstrom et al. | ............. 707/778 |
| 2013/0185288 | A1 | 7/2013 | Nishiyama et al. | |
| 2013/0195367 | A1 | 8/2013 | Ohira et al. | |
| 2014/0129981 | A1* | 5/2014 | Soderberg | ..................... 715/810 |

FOREIGN PATENT DOCUMENTS

JP 2011-242816 12/2011

OTHER PUBLICATIONS

Ohira, et al., U.S. Appl. No. 13/676,640, filed Nov. 14, 2012.
Nishiyama, et al., U.S. Appl. No. 13/741,733, filed Jan. 15, 2013.

* cited by examiner

*Primary Examiner* — Christopher K Peterson
(74) *Attorney, Agent, or Firm* — Nixon & Vanderhye, P.C.

(57) ABSTRACT

According to an embodiment, an information processing apparatus includes a first image acquisition unit, a first information acquisition unit, a reception unit, a generation unit, and a writing unit. The first image acquisition unit is configured to acquire a first image obtained by imaging by an imaging unit. The first information acquisition unit is configured to acquire any of multiple pieces of information capable of being associated with the first image. The reception unit is configured to receive a first input. The generation unit is configured to associate the first image acquired in the first image acquisition unit with the information piece acquired in the first information acquisition unit to generate an association data piece when the reception unit receives the first input. The writing unit is configured to write the association data piece into a storage unit.

15 Claims, 8 Drawing Sheets

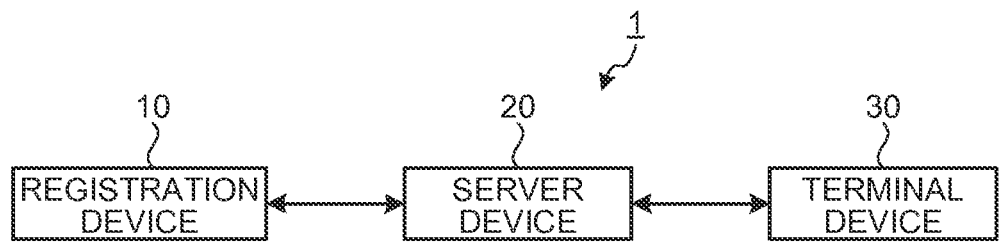
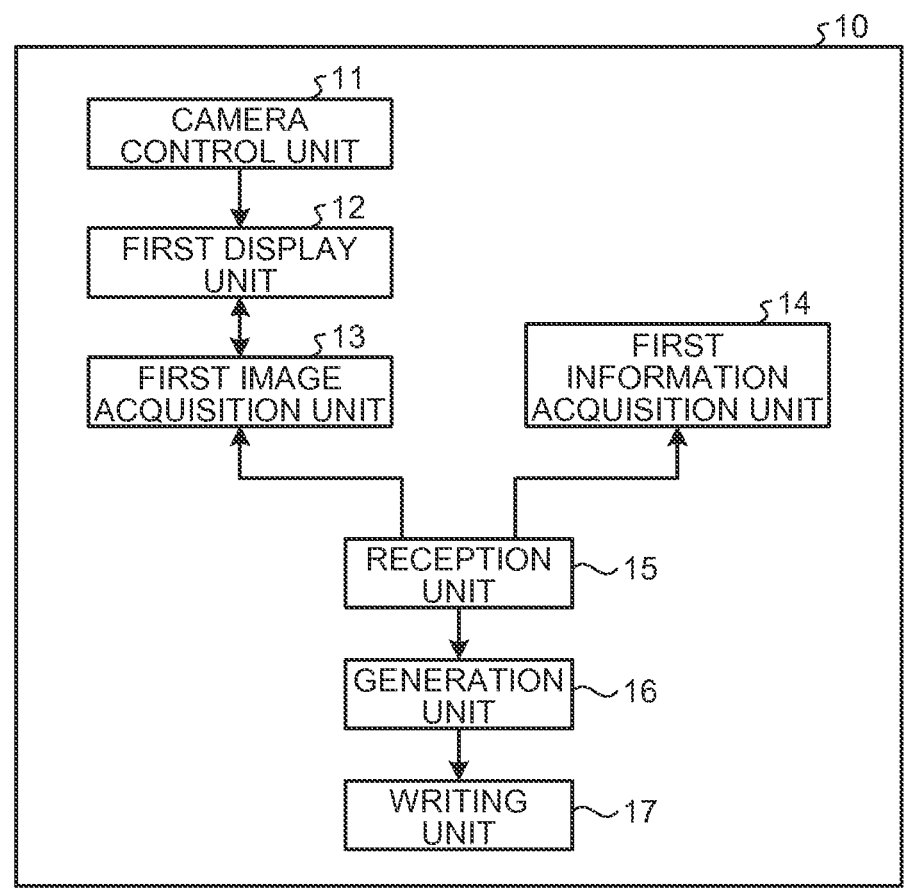

| IMAGE INFORMATION | CONTENT ID |
|---|---|
| IMAGE A | CONTENT PIECE 1, CONTENT PIECE 2 |
| IMAGE B | CONTENT PIECE 1 |
| IMAGE C | CONTENT PIECE 3, CONTENT PIECE 4 |

ASSOCIATION DATA PIECE (row for IMAGE A)

INFORMATION PROCESSING APPARATUS, INFORMATION PROCESSING METHOD AND COMPUTER PROGRAM PRODUCT

CROSS-REFERENCE TO RELATED APPLICATIONS

This application is based upon and claims the benefit of priority from Japanese Patent Application No. 2013-076979, filed on Apr. 2, 2013; the entire contents of which are incorporated herein by reference.

FIELD

Embodiments described herein relate generally to an information processing apparatus, an information processing method, and a computer program product.

BACKGROUND

Conventionally, there is known a technique of displaying virtual information so as to be superimposed over an image obtained by imaging a subject (imaging target) in the real world.

For example, there is known a technique of identifying an imaging target on the basis of the position and the angle of a terminal device, and displaying virtual information which has been previously associated with the imaging target so as to be superimposed over an image of the imaging target.

However, since the association relationship between an imaging target and virtual information is previously fixed in the conventional technique, there has been no system capable of, for example, freely registering association data obtained by associating an image of an imaging target with virtual information while imaging various imaging targets. Therefore, the convenience of a user is disadvantageously low.

BRIEF DESCRIPTION OF THE DRAWINGS

FIG. 1 is a diagram illustrating an example of the configuration of an information processing system according to a first embodiment;

FIG. 2 is a diagram illustrating an example of the functional configuration of a registration device according to the first embodiment;

DETAILED DESCRIPTION

Figure 3:
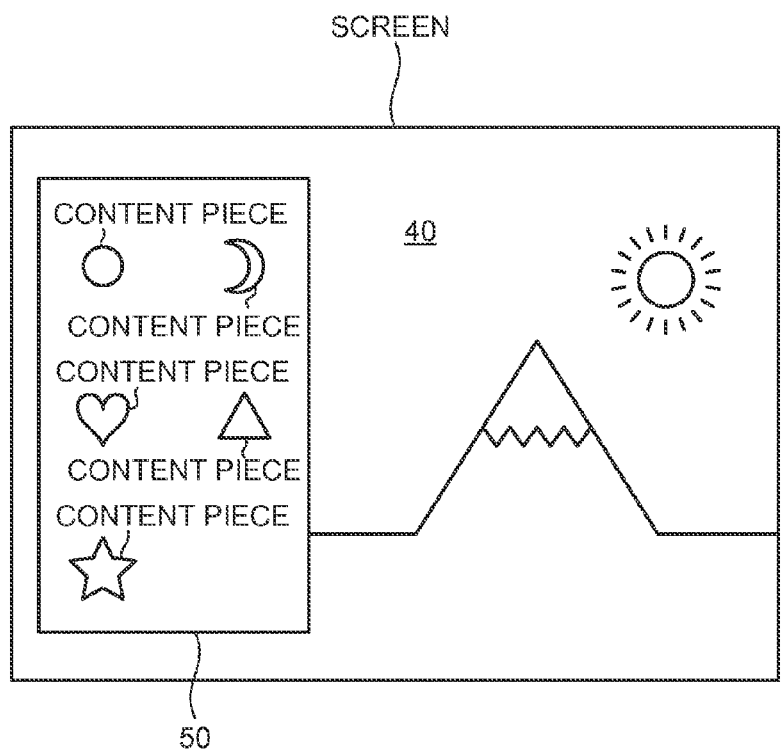
FIG. 3 is a diagram illustrating an example of the display on a screen according to the first embodiment.

According to an embodiment, an information processing apparatus includes a first image acquisition unit, a first information acquisition unit, a reception unit, a generation unit, and a writing unit. The first image acquisition unit is configured to acquire a first image obtained by imaging by an imaging unit. The first information acquisition unit is configured to acquire any of multiple pieces of information capable of being associated with the first image. The reception unit is configured to receive a first input. The generation unit is configured to associate the first image acquired in the first image acquisition unit with the information piece acquired in the first information acquisition unit to generate an association data piece when the reception unit receives the first input. The writing unit is configured to write the association data piece into a storage unit.

Various embodiments will be described in detail below with reference to the accompanying drawings.

First Embodiment

FIG. 1 is a diagram illustrating an example of the schematic configuration of an information processing system 1 according to the first embodiment. As illustrated in FIG. 1, the information processing system 1 includes a registration device 10, a server device 20, and a terminal device 30. In the example illustrated in FIG. 1, the server device 20 is connected to each of the registration device 10 and the terminal device 30 via a network. In this specification, the information processing system 1 including a single terminal device 30 will be described as an example for convenience of explanation. However, the number of terminal devices 30 provided in the information processing system 1 is not limited to one, and may be any number.

First, the details of the registration device 10 will be described. FIG. 2 is a diagram illustrating an example of the functional configuration of the registration device 10. The registration device 10 includes a portable information processing apparatus that has a function of imaging an imaging target (subject) and a touch panel function, and corresponds to "information processing apparatus" in the claims. In this example, the registration device 10 is equipped with a camera (not illustrated) which is an example of "imaging unit" in the claims and a touch panel display (not illustrated). In the present specification, "imaging" indicates converting an image of a subject (imaging target) formed by an optical system such as a lens into an electrical srgnal.

As illustrated in FIG. 2, the registration device 10 includes a camera control unit 11, a first display unit 12, a first image acquisition unit 13, a first information acquisition unit 14, a reception unit 15, a generation unit 16, and a writing unit 17.

When starting using the camera mounted on the registration device 10, the camera control unit 11 continuously performs control for imaging an imaging target at which a lens of the camera is pointed at a predetermined cycle. Every time when imaging is performed by the camera, the first display unit 12 performs control for displaying an image obtained by the imaging (in the following description, may also be referred to as "first image") on the touch panel display mounted on the registration device 10. The touch panel display mounted on the registration device 10 has an area in which various pieces of information are displayed (in the following description, referred to as "screen"), and the first image obtained by imaging by the camera is displayed on the screen. In this example, when an imaging target at which the lens of the camera is pointed is switched to another imaging target, or when a target over which the registration device 10 equipped with the camera is held is switched to another target, a first image displayed on the screen is also switched to another first image in response thereto.

In the present embodiment, the first display unit 12 performs control for displaying multiple pieces of content capable of being associated with (linked to) a first image on the screen. In this specification, the content indicates information that includes at least one of an image (video), voice, text and URL indicating a link destination (address information), and corresponds to "information" in the claims. As will be described later, in the present embodiment, content is stored in the server device 20. The first display unit 12 accesses the server device 20 to acquire multiple pieces of content capable of being associated with a first image. Then, the first display unit 12 performs control for displaying the acquired multiple pieces of content (or may also be icon images corresponding to the respective pieces of content) on the screen.

FIG. 3 is a diagram illustrating an example of the display on the screen according to the first embodiment. As illustrated in FIG. 3, the screen includes an image area 40 in which the first image is displayed and a content area 50 in which multiple pieces of content are displayed. In this example, the image area 40 corresponds to "image area" in the claims, and the content area 50 corresponds to "information area" in the claims.

The description will be continued with reference to FIG. 2. The first image acquisition unit 13 has a function of acquiring the first image. In the present embodiment, the first image acquisition unit 13 has a function of acquiring the first image displayed on the screen according to an instruction from the reception unit 15.

The first information acquisition unit 14 has a function of acquiring any of multiple pieces of content. In the present embodiment, the first information acquisition unit 14 has a function of acquiring any of multiple pieces of content that are displayed on the content area 50 according to an instruction from the reception unit 15.

The reception unit 15 has a function of receiving a first input from a user. In the present embodiment, the first input indicates an input for instructing selection of any piece of the content. When receiving the first input, the reception unit 15 instructs the first image acquisition unit 13 to acquire a first image, and instructs the first information acquisition unit 14 to acquire a content piece that has been instructed to be selected.

More specifically, the first input in the present embodiment is an input according to an operation of: bringing a pointing object such as a finger and a touch pen into contact with a first area on the screen in which any piece of the content is displayed; then moving the pointing object to the image area 40 with being in contact with the screen; and then releasing the pointing object from the screen. In this example, the reception unit 15 has a function of detecting the contact position (touch position) of the pointing object with the screen and the trajectory of the contact position. The reception unit 15 instructs the first display unit 12 to display the content piece so as to follow the detected contact position and trajectory. Upon receiving the instruction, the first display unit 12 performs control for displaying the content piece displayed in the first area so as to follow the trajectory of the pointing object which moves while making contact with the screen.

When receiving the first input, the reception unit 15 instructs the first image acquisition unit 13 to acquire a first image that is being displayed on the screen when the pointing object is released from the screen, and instructs the first information acquisition unit 14 to acquire a content piece corresponding to the first area (a content piece that has been instructed to be selected).

When the reception unit 15 receives the first input, the generation unit 16 associates the first image acquired in the first image acquisition unit 13 with the content piece acquired in the first information acquisition unit 14 to thereby generate an association data piece. In the present embodiment, when receiving the first input, the reception unit 15 instructs the generation unit 16 to generate an association data piece. Then, upon receiving the instruction, the generation unit 16 associates the first image acquired in the first image acquisition unit 13 (in this example, the first image that is being displayed when the pointing object is released from the screen) with the content piece acquired in the first information acquisition unit 14 (the content piece corresponding to the first area) to thereby generate an association data piece. In this example, the generation unit 16 associates image that indicates the first image acquired in the first image acquisition unit 13 with a content ID that identifies the content piece acquired in the first information acquisition unit 14 to thereby generate the association data piece. However, the generation unit 16 is not limited thereto.

Figure 4:
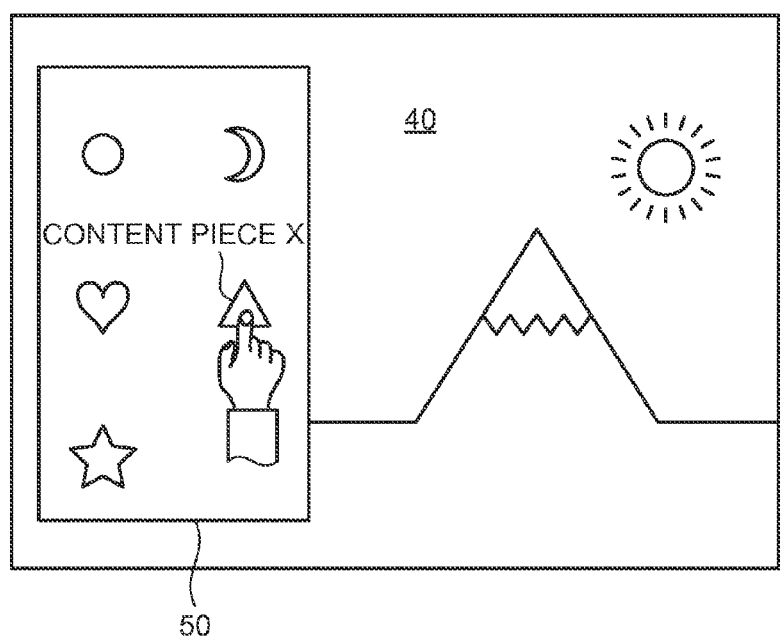
FIG. 4 is a diagram illustrating an example of the display on the screen according to the first embodiment.
Figure 5:
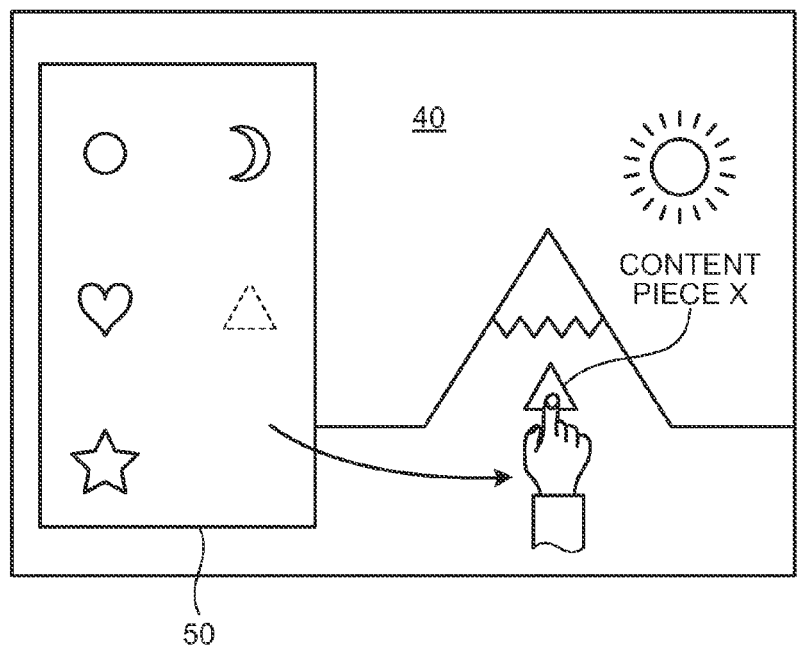
FIG. 5 is a diagram illustrating an example of the display on the screen according to the first embodiment.

For example, a case where a user performs an operation in which a finger of the user is brought into contact with the first area in which a content piece X is displayed in the content area 50 as illustrated in FIG. 4, then moved to the image area 40 with being in contact with the screen as illustrated in FIG. 5, and then released from the screen is assumed. In this case, as illustrated in FIGS. 4 and 5, the first display unit 12 performs control for displaying the content piece X so as to follow the trajectory of the finger. When a user releases his/her finger from the screen as illustrated in FIG. 5, the first image that is being displayed in the image area 40 at this moment is associated with the content piece X so that an association data piece is generated.

The description will be continued with reference to FIG. 2. The writing unit 17 performs control for writing the association data piece generated in the generation unit 16 into the server device 20. Although, in this example, the server device 20 corresponds to "storage unit" in the claims, the server device 20 is not limited thereto.

The registration device 10 according to the present embodiment has a hardware configuration that uses a computer provided with a CPU, a storage unit such as read only memory (ROM) and RAM, and a touch panel display. The functions of the respective units (the camera control unit 11, the first display unit 12, the first image acquisition unit 13, the first information acquisition unit 14, the reception unit 15, the generation unit 16, and the writing unit 17) of the registration device 10 are implemented by executing programs stored in the storage unit by the CPU, but not limited thereto. For example, at least some of the functions of the respective units of the registration device 10 may also be implemented by a hardware circuit (a semiconductor integrated circuit, for example).

Figure 6:
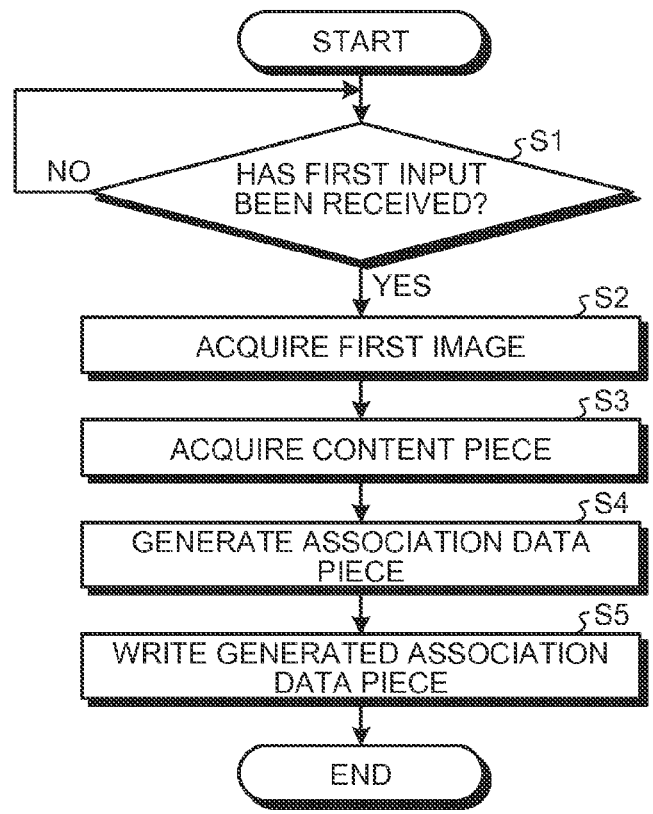
FIG. 6 is a flowchart illustrating an example of the operation of the registration device according to the first embodiment.

Next, an example of the operation of the registration device 10 will be described. FIG. 6 is a flowchart illustrating an example of the operation of the registration device 10. As illustrated in FIG. 6, the reception unit 15 first determines whether or not the first input has been received (step S1). When the first input is determined to have been received (YES at step S1), the reception unit 15 instructs the first image acquisition unit 13 to acquire a first image, and instructs the first information acquisition unit 14 to acquire a content piece that has been instructed to be selected. Further, the reception unit 15 instructs the generation unit 16 to generate an association data piece.

Upon receiving the instruction from the reception unit 15, the first image acquisition unit 13 acquires the first image (step S2). Upon receiving the instruction from the reception unit 15, the first information acquisition unit 14 acquires the content piece that has been instructed to be selected (step S3). Step S2 and step S3 can be performed in any order, and may also be performed at the same time.

Then, upon receiving the instruction from the reception unit 15, the generation unit 16 associates the first image acquired in step S2 with the content piece acquired in step S3 to thereby generate an association data piece (step S4). Then, the writing unit 17 performs control for writing the association data piece generated in step S4 into the server device 20 (step S5).

Figures 7, 8:
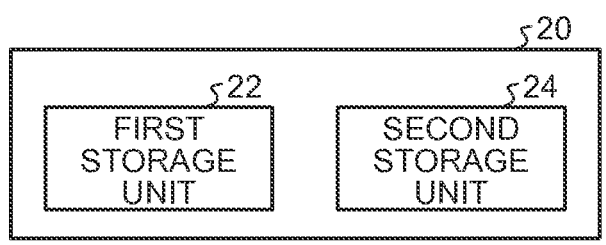
FIG. 7 is a diagram illustrating an example of the configuration of a server device according to the first embodiment.
FIG. 8 is a diagram schematically illustrating data stored in a first storage unit according to the first embodiment.

Next, the details of the server device 20 will be described. As illustrated in FIG. 7, the server device 20 includes a first storage unit 22 and a second storage unit 24. The first storage unit 22 stores therein association data generated in the registration device 10. FIG. 8 is a diagram schematically illustrating multiple pieces of association data stored in the first storage unit 22. As illustrated in FIG. 8, the first storage unit 22 stores therein multiple pieces of association data each piece of which is generated by associating image indicating a first image with one or more content IDs. For example, an association data piece in the first line indicates that a content ID representing "CONTENT 1" and a content ID representing "CONTENT 2" are associated with image representing "IMAGE A".

The second storage unit 24 associates respective multiple content IDs with content information indicating respective content pieces (information including the contents and the displayed position), and stores therein the associated content IDs and content information. In this example, the associated content piece (content information) can be identified by using the content ID contained in the association data piece as a key. Therefore, the association data piece can be regarded as associating image (first image) with a content piece. The configuration of each association data piece is not limited to the above configuration. For example, the association data piece may be configured by associating image with content information.

Although not described in detail here, the server device 20 has a function of communicating with each of the registration device 10 and the terminal device 30. In response to a request from the registration device 10 or the terminal device 30, the server device 20 can write association date into the first storage unit 22, and read out (also transmit) and delete information stored in the first storage unit 22 and the second storage unit 24.

Figure 9:
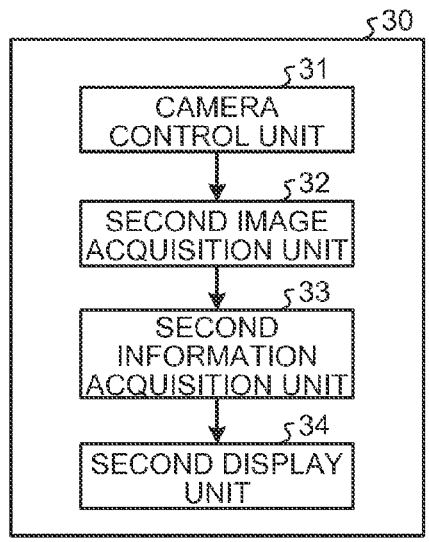
FIG. 9 is a diagram illustrating an example of the functional configuration of a terminal device according to the first embodiment.

Next, the details of the terminal device 30 will be described. FIG. 9 is a block diagram illustrating an example of the functional configuration of the terminal device 30. In the present embodiment, the terminal device 30 includes a portable information processing apparatus that has a function of imaging an imaging target. In this example, the terminal device 30 is equipped with a camera (not illustrated). As illustrated in FIG. 9, the terminal device 30 includes a camera control unit 31, a second image acquisition unit 32, a second information acquisition unit 33, and a second display unit 34.

When starting using the camera mounted on the terminal device 30, the camera control unit 31 continuously performs control for imaging an imaging target at which a lens of the camera is pointed at a predetermined cycle. Every time when imaging is performed by the camera, the second image acquisition unit 32 acquires an image obtained by the imaging (in the following description, may also be referred to as "second image"), and outputs the acquired second image to the second information acquisition unit 33.

The second information acquisition unit 33 determines whether or not the second image acquired by the second image acquisition unit 32 matches any image (first image) contained in the association data registered in the server device 20. When there is no image that matches the second image acquired by the second image acquisition unit 32 in the image contained in the association data registered in the server device 20, the second information acquisition unit 33 directly outputs the second image to the second display unit 34. On the other hand, when there is an image that matches the second image acquired by the second image acquisition unit 32 in the image contained in the association data registered in the server device 20, the second information acquisition unit 33 acquires a content piece that is associated with the image that matches the second image. In the present embodiment, the second information acquisition unit 33 acquires content information corresponding to a content ID that is associated with the image that matches the second image in the image contained in the registered association data from the server device 20. Then, the second information acquisition unit 33 outputs the content piece (content information) acquired from the server device 20 to the second display unit 34 together with the second image acquired by the second image acquisition unit 32.

The second display unit 34 performs control for displaying the information output from the second information acquisition unit 33 on a display device (not illustrated) which is mounted on the terminal device 30. The display device mounted on the terminal device 30 has an area (screen) on which various pieces of information are displayed, and information output from the second information acquisition unit 33 is displayed on the screen. As described above, for example, when there is no image that matches the second image acquired by the second image acquisition unit 32 in the image contained in the registered association data, the second information acquisition unit 33 directly outputs the second image to the second display unit 34. Therefore, the second display unit 34 performs control for directly displaying the second image output from the second information acquisition unit 33 on the screen.

On the other hand, when there is an image that matches the second image acquired by the second image acquisition unit 32 in the image contained in the registered association data, the second information acquisition unit 33 outputs a content piece that is associated with the image that matches the second image and the second image acquired by the second image acquisition unit 32. Therefore, the second display unit 34 performs control for displaying a superimposed image of the second image output from the second information acquisition unit 33 and the content piece on the screen.

The terminal device 30 according to the present embodiment has a hardware configuration that uses a computer provided with a CPU, a storage unit such as read only memory (ROM) and RAM, and a display device. The functions of the respective units (the camera control unit 31, the second image acquisition unit 32, the second information acquisition unit 33, and the second display unit 34) of the terminal device 30 are implemented by executing programs stored in the storage unit by the CPU, but not limited thereto. For example, at least some of the functions of the respective units of the terminal device 30 may also be implemented by a hardware circuit (a semiconductor integrated circuit, for example).

Figure 10:
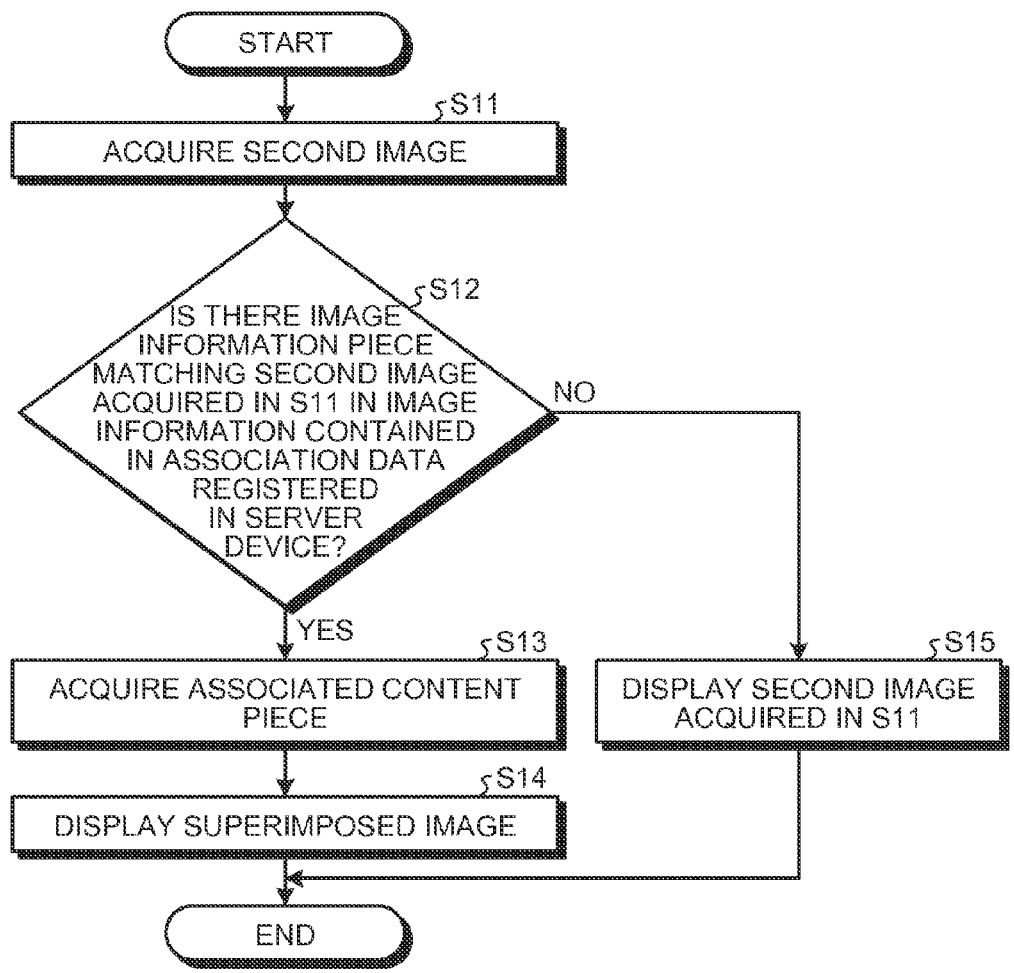
FIG. 10 is a flowchart illustrating an example of the operation of the terminal device according to the first embodiment.

Next, an example of the operation of the terminal device 30 will be described. FIG. 10 is a flowchart illustrating an example of the operation of the terminal device 30. As illustrated in FIG. 10, every time when imaging is performed by the camera, the second image acquisition unit 32 acquires an image (second image) obtained by the imaging (step S11). Then, the second information acquisition unit 33 determines whether or not there is any image that matches the second image acquired in step S11 in the image contained in the association data registered in the server device 20 (step S12).

In step S12 described above, when an image that matches the second image acquired in step S11 is determined to exist in the image contained in the registered association data (YES at step S12), the second information acquisition unit 33 acquires a content piece that is associated with the image that matches the second image acquired in step S11 from the server device 20 (step S13). Then, the second information acquisition unit 33 outputs the acquired content piece and the second image acquired in step S11 to the second display unit 34. Then, the second display unit 34 performs control for displaying a superimposed image of the second image output from the second information acquisition unit 33 and the content piece on the screen (step S14).

On the other hand, when an image that matches the second image acquired in step S11 is determined not to exist in the image contained in the registered association data (NO at step S12), the second information acquisition unit 33 directly outputs the second image acquired in step S11 to the second display unit 34. Then, the second display unit 34 performs control for directly displaying the second image output from the second information acquisition unit 33 on the screen (step S15).

As described above, in the present embodiment, when receiving the first input, a first image obtained by imaging by the camera is associated with any piece of the content to generate (and register) an association data piece. Therefore, a user can freely register an association data piece in which the first image is associated with any piece of the content by pointing the lens of the camera mounted on the registration device 10 at a desired imaging target, or holding the registration device 10 equipped with the camera over a desired imaging target to perform the operation for the first input.

More specifically, the first input is made for instructing selection of any piece of the content. When receiving the first input, the reception unit 15 instructs the first image acquisition unit 13 to acquire a first image, and instructs the first information acquisition unit 14 to acquire a content piece that has been instructed to be selected. In the above embodiment, only by pointing the lens of the camera mounted on the registration device 10 at a desired imaging target and performing an operation for instructing selection of a desired content piece while confirming a first image displayed on the screen, a user can generate an association data piece in which the first image that is being displayed on the screen at this moment is associated with the content piece that has been instructed to be selected, and register the generated association data piece. As described above, according to the present embodiment, an advantageous effect such as further improved convenience of a user who registers association data can be achieved.

Modification 1 of First Embodiment

For example, the first input may be an input according to an operation of bringing a pointing object (a finger or a touch pen, for example) into contact with a first area on the screen in which any piece of content is displayed. When receiving such a first input, the reception unit 15 instructs the first image acquisition unit 13 to acquire a first image that is being displayed on the screen when the pointing object makes contact with the screen, and instructs the first information acquisition unit 14 to acquire a content piece that corresponds to the first area (a content piece corresponding to an area on the screen with which the pointing object makes contact). In this case, only by bringing the pointing object such as a finger into contact with the area (the first area) in which a desired content piece is displayed in the content area 50, a user can generate an association data piece by associating the first image that is being displayed on the screen at this moment with the desired content piece and register the generated association data piece. As a result, the convenience of a user is further improved.

Modification 2 of First Embodiment

The first input is only required to be an initiator for generating an association data piece, and the mode thereof can therefore be voluntarily changed. For example, the first input may include an input for instructing display of a still image of an imaging target at which the lens of the camera mounted on the registration device 10 is pointed and an input for instructing selection of any piece of content. In such a first input, for example, when a user performs an operation for instructing display of a still image of a first image that is being currently displayed on the screen while confirming first images which are sequentially displayed on the screen such as an operation of touching an icon of a photographing button, the reception unit 15 receives an input according to the operation. Then, the reception unit 15 instructs the first display unit 12 to display the still image of the first image that is currently being displayed on the screen, and instructs the first image acquisition unit 13 to acquire the first image displayed as the still image. Thereafter, when the user performs an operation for instructing selection of a desired content piece, the reception unit 15 receives an input according to the operation. Then, the reception unit 15 can instruct the first information acquisition unit 14 to acquire the content piece that has been instructed to be selected, and instruct the generation unit 16 to generate an association data piece.

In this example, a user points the lens of the camera mounted on the registration device 10 at a desired imaging target, or holds the registration device 10 equipped with the camera over a desired imaging target, then performs an operation for instructing display of a still image of a first image that is being currently displayed on the screen while confirming first images which are sequentially displayed on the screen such as an operation of touching an icon of a photographing button, and then performs an operation for instructing selection of a desired content piece. As a result, the user can generate an association data piece in which the still image of the first image is associated with the content piece that has been instructed to be selected, and register the generated association data piece.

Modification 3 of First Embodiment

For example, when a first image acquired in the first image acquisition unit 13 matches or is similar to an image contained in association data registered in the server device 20, and a content piece that is associated with the image that matches or is similar to the first image acquired in the first image acquisition unit 13 in content contained in the association data registered in the server device 20 matches a content piece acquired in the first information acquisition unit 14, the generation unit 16 may not generate an association data piece. That is, when attempting to associate the same content piece with similar images, overlapping registration may not be performed.

In such a configuration, a function of determining whether or not a first image acquired in the first image acquisition unit 13 matches or is similar to an image contained in association data registered in the server device 20 and a function of determining whether or not a content piece that is associated with the image that matches or is similar to the first image acquired in the first image acquisition unit 13 in content contained in the association data registered in the server device 20 matches a content piece acquired in the first information acquisition unit 14 may be provided in the generation unit 16, or may also be separately (independently) provided from the generation unit 16.

Modification 4 of First Embodiment

Figure 11:
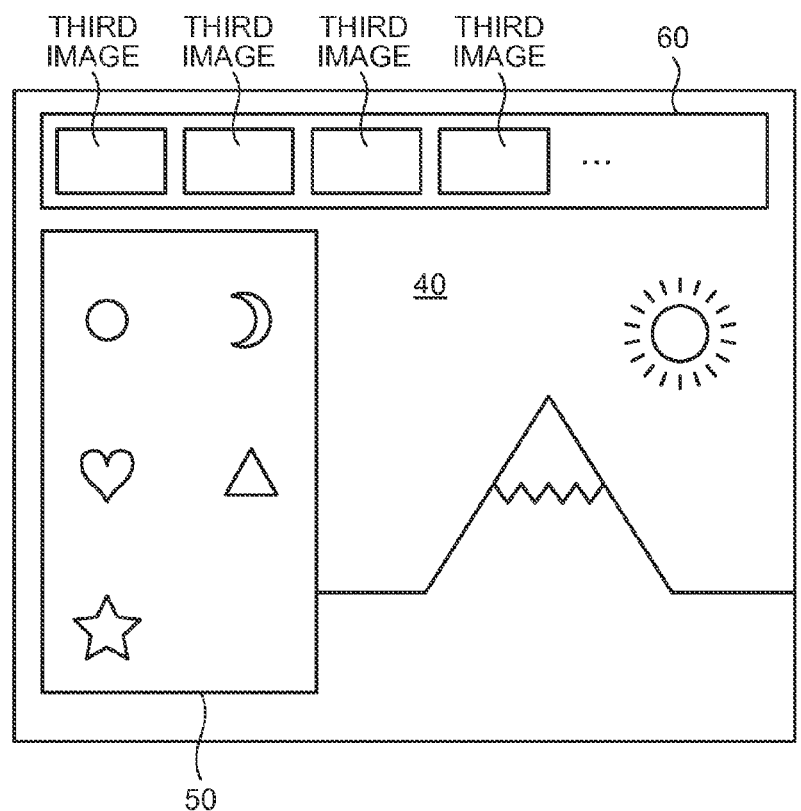
FIG. 11 is a diagram illustrating an example of the display on a screen according to a modification.

For example, as illustrated in FIG. 11, the first display unit 12 can also display third images capable of identifying first images with which respective content pieces have already been associated. In the example illustrated in FIG. 11, the third images are thumbnail images (reduced images for listing multiple images) of first images with which respective content pieces have already been associated. However, the third images are not limited thereto. In the example illustrated in FIG. 11, the screen further includes a candidate area 60 in which the multiple third images are displayed in addition to the image area 40 and the content area 50.

In the example illustrated in FIG. 11, when receiving a sixth input for instructing selection of any of the third images, the reception unit 15 instructs the first image acquisition unit 13 to acquire a first image, and instructs the generation unit 16 to generate an association data piece in which a content piece that corresponds to the third image that has been instructed to be selected (the same content piece as a content piece that has already been associated with the first image identified by the selected third image) is associated with the first image acquired in the first image acquisition unit 13. In this example, the sixth input indicates an input according to an operation of bringing a pointing object such as a finger and a touch pen into contact with an area in which any of the third images is displayed in the candidate area 60. However, the sixth input is not limited thereto.

For example, when attempting to associate multiple content pieces that are the same as multiple content pieces associated with an image contained in the registered association data with an imaging target at which the lens of the camera mounted on the registration device 10 is pointed, it is only required for a user to perform an operation for instructing selection of a thumbnail image (third image) that corresponds to the image (the first image with which the content pieces are already associated) in the candidate area 60. Therefore, the convenience of a user is further improved.

Second Embodiment

Next, the second embodiment will be described. The second embodiment is different from the first embodiment in that the registration device 10 and the terminal device 30 are configured as a single device. Hereinbelow, the details of the second embodiment will be described. A description of overlapping points with the first embodiment will appropriately be omitted.

Figure 12:
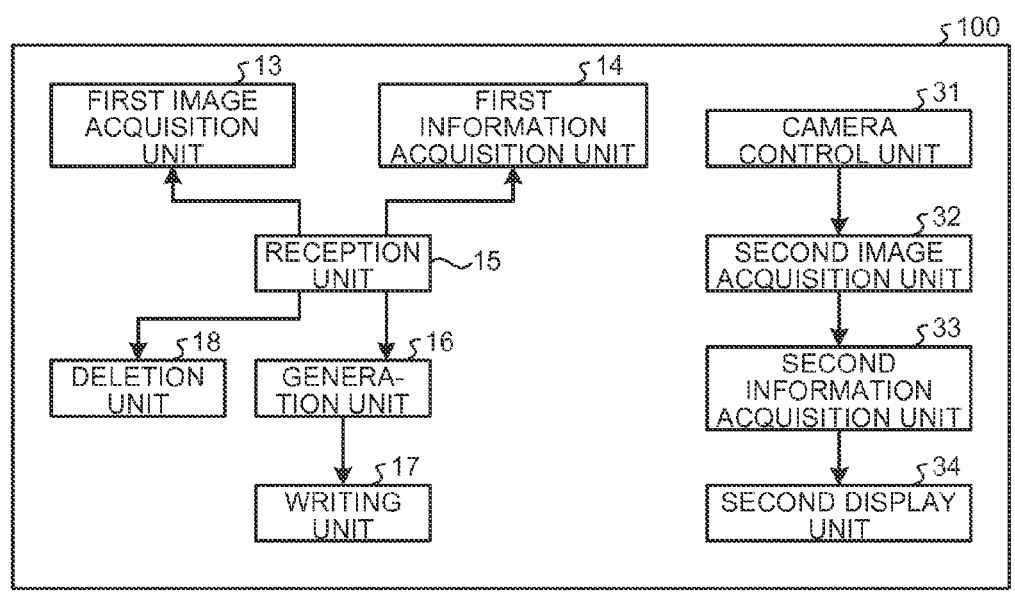
FIG. 12 is a diagram illustrating an example of the functional configuration of an information processing apparatus according to a second embodiment.

FIG. 12 is a diagram illustrating an example of the functional configuration of an information processing apparatus 100 according to the second embodiment. The information processing apparatus 100 includes a portable information processing apparatus that has a function of imaging an imaging target and a touch panel function, and corresponds to "information processing apparatus" in the claims. In this example, the information processing apparatus 100 is equipped with a camera (not illustrated) and a touch panel display (not illustrated). Further, the information processing apparatus 100 is equipped with the functions of the registration device 10 and the functions of the terminal device 30. The information processing apparatus 100 is connected to the server device 20 via a network.

As illustrated in FIG. 12, the information processing apparatus 100 includes a first image acquisition unit 13, a first information acquisition unit 14, a reception unit 15, a generation unit 16, a writing unit 17, a deletion unit 18, a camera control unit 31, a second image acquisition unit 32, a second information acquisition unit 33, and a second display unit 34.

In this example, the camera control unit 31 also serves as the camera control unit 11 described above. The second display unit 34 also serves as the first display unit 12 described above. Therefore, the second display unit 34 also performs control for displaying multiple pieces of content that can be associated with an image obtained by imaging by the camera on the screen (here, the screen indicates an area in which various pieces of information are displayed on the touch panel display mounted on the information processing apparatus 100). In the following description, an area on the screen in which an image (including a superimposed image) is displayed is referred to as an image area, and an area on the screen in which multiple pieces of content (may be icon images corresponding to the respective pieces of content) are displayed is referred to as a content area. In this example, an image obtained by imaging by the camera mounted on the information processing apparatus 100 can be regarded as the above-described second image, and can also be regarded as the above-described first image. In the following description, in images obtained by imaging by the camera, an image acquired in the second image acquisition unit 32 is referred to as "second image", and an image acquired in the first image acquisition unit 13 is referred to as "first image", thereby distinguishing the images.

In the present embodiment, when a user starts using the camera mounted on the information processing apparatus 100, the camera control unit 31 continuously performs control for imaging an imaging target (subject) at which a lens of the camera is pointed at a predetermined cycle. Every time when imaging is performed by the camera, the second image acquisition unit 32 acquires an image obtained by the imaging, and outputs the acquired image (second image) to the second information acquisition unit 33. Then, in the same manner as in the first embodiment, when there is no image that matches the second image acquired by the second image acquisition unit 32 in image contained in association data registered in the server device 20, the second image is directly displayed on the screen. On the other hand, when there is an image that matches the second image in the image contained in the association data registered in the server device 20, a superimposed image of a content piece that is associated with the image that matches the second image and the second image is displayed on the screen.

Next, the function of the deletion unit 18 will be described. Under the state that the superimposed image is displayed on the screen, when the reception unit 15 receives a second input for instructing deletion of an association data piece in which a content piece included in a superimposed image is associated with an image, the deletion unit 18 performs control for deleting the association data piece from the server device 20. The second input in the present embodiment indicates an input according to an operation of: bringing a pointing object into contact with a second area in which the content piece included in the superimposed image is displayed in the image area; moving the pointing object to the outside of the image area (to the content area, for example) with being in contact with the screen; and then releasing the pointing object from the screen. However, the second input is not limited thereto. For example, the second input may be an input according to an operation of bringing a pointing object such as a finger and a touch pen into contact with an icon (UI image) which is used for instructing deletion of the association data piece that corresponds to the content piece included in the superimposed image and displayed on the screen. Further, the second input may be an input according to an operation of shaking the information processing apparatus 100.

When the reception unit 15 receives the second input, the reception unit 15 instructs the deletion unit 18 to delete the association data piece in which the content piece included in the superimposed image is associated with the image. Upon receiving the instruction, the deletion unit 18 performs control for deleting the association data piece in which the content piece included in the superimposed image is associated with the image from the server device 20. More specifically, the deletion unit 18 performs control for deleting the association data piece in which a content ID that identifies the content piece included in the superimposed image is associated with the image among the association data pieces registered in the server device 20 from the first storage unit 22.

Figure 13:
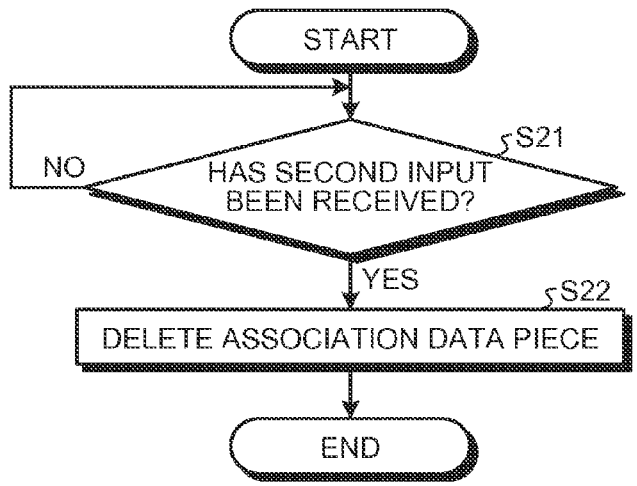
FIG. 13 is a flowchart illustrating an example of the operation of the information processing apparatus according to the second embodiment.

FIG. 13 is a flowchart illustrating an example of the operation of the information processing apparatus 100 when deleting an association data piece that corresponds to a content piece included in a superimposed image. As illustrated in FIG. 13, the reception unit 15 first determines whether or not the second input has been received (step S21). When the second input is determined to have been received (YES at step S21), the reception unit 15 instructs the deletion unit 18 to delete an association data piece that corresponds to a content piece included in a superimposed image. Upon receiving the instruction, the deletion unit 18 performs control for deleting the association data piece that corresponds to the content piece included in the superimposed image from the server device 20 (step S22).

Next, an example of a method for generating an association data piece in which a content piece included in a superimposed image is associated with a new first image and registering the generated association data piece. In the present embodiment, when the reception unit 15 receives a third input for instructing registration of an association data piece in which a content piece included in a superimposed image is associated with a first image newly acquired in the first image acquisition unit 13, the generation unit 16 generates the association data piece in which the content piece included in the superimposed image is associated with the first image newly acquired in the first image acquisition unit 13. Then, the writing unit 17 performs control for writing the association data piece newly generated by the generation unit 16 into the server device 20.

The third input in the present embodiment includes a fourth input for instructing selection of a content piece that is included in a superimposed image and a fifth input for instructing acquisition of a first image. When receiving the fourth input, the reception unit 15 selects the content piece included in the superimposed image. In the present embodiment, the fourth input indicates an input according to an operation of bringing a pointing object into contact with the second area on the screen in which the content piece included in the superimposed image is displayed. However, the fourth input is not limited thereto. For example, the fourth input may be an input according to an operation of shaking the information processing apparatus 100, and may also be an input according to an operation of lifting up and scooping the information processing apparatus 100. When receiving the fourth input, the reception unit 15 selects the content piece that is included in the superimposed image.

A method for selecting a content piece included in a superimposed image may be any method. For example, the reception unit 15 can select a content piece included in a superimposed image by instructing deletion unit 18 to delete an association data piece that corresponds to the content piece included in the superimposed image and also cutting off a content ID from the association data piece that corresponds to the content piece included in the superimposed image. Alternatively, for example, the reception unit 15 can select a content piece included in a superimposed image by generating a copy of a content ID from an association data piece that corresponds to the content piece included in the superimposed image.

Further, when receiving the fourth input, the reception unit 15 instructs the second display unit 34 to perform control for displaying the content piece included in the superimposed image so as to stick to a pointing object. Upon receiving the instruction, the second display unit 34 performs control for displaying the content piece included in the superimposed image so as to stick to the pointing object. As a result, a user can intuitively understand that the content piece included in the superimposed image has been selected.

When receiving a fifth input after the fourth input, the reception unit 15 instructs the first image acquisition unit 13 to acquire a first image, and instructs the generation unit 16 to generate an association data piece in which the first image acquired in the first image acquisition unit 13 is associated with the content piece that has been selected in response to the fourth input. Although the fifth input indicates an input according to an operation of releasing a pointing object from the screen in the present embodiment, the fifth input is not limited thereto. Upon receiving the instruction from the reception unit 15, the first image acquisition unit 13 acquires an image that has been obtained by imaging and is being displayed on the screen when the pointing object is released from the screen. Upon receiving the instruction from the reception unit 15, the generation unit 16 associates the image (first image) acquired by the first image acquisition unit 13 with the content piece (the content ID in this example) selected by the reception unit 15 to thereby generate an association data piece.

For example, a user performs an operation of bringing a pointing object into contact with the second area on the screen in which a content piece is displayed (an operation for instructing selection of the content piece), and then performs and operation of switching an imaging target (a target over which the information processing apparatus 100 equipped with the camera is held) to another imaging target with the pointing object being in contact with the screen to thereby switch an image displayed on the screen to another image and then releasing the pointing object from the screen. In this manner, a user can generate an association data piece in which the content piece that has been instructed to be selected is associated with the image that is being displayed when the pointing object is released from the screen, and register the generated association data piece.

Figure 14:
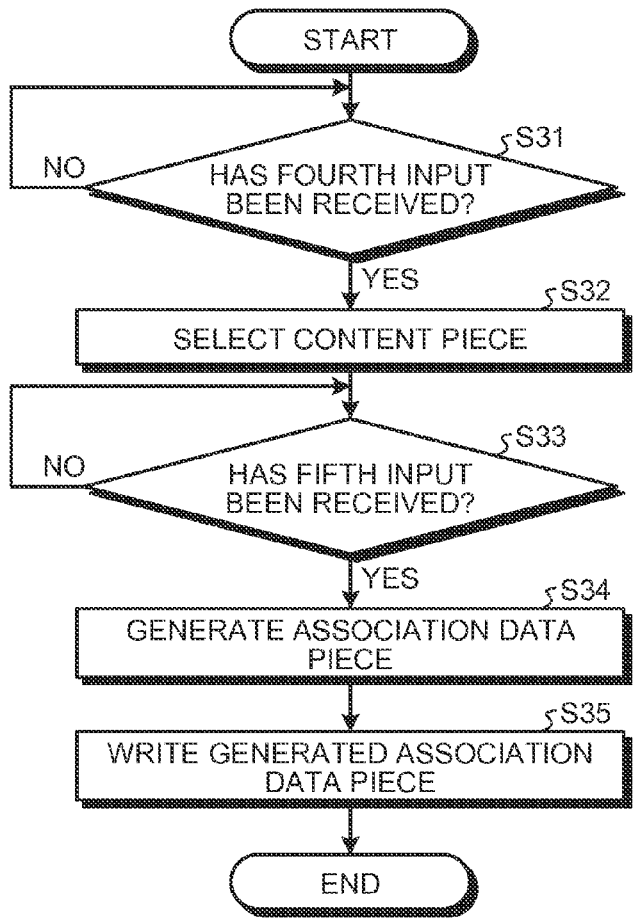
FIG. 14 is a flowchart illustrating an example of the operation of the information processing apparatus according to the second embodiment.

FIG. 14 is a flowchart illustrating an example of the operation of the information processing apparatus 100 when generating an association data piece in which a content piece included in a superimposed image is associated with a newly acquired first image, and registering the generated association data piece. As illustrated in FIG. 14, the reception unit first determines whether or not the fourth input has been received (step S31). When the fourth input is determined to have been received (YES at step S31), the reception unit 15 selects a content piece included in a superimposed image (step S32). Then, the reception unit 15 determines whether or not the fifth input has been received (step S33). When the fifth input is determined to have been received (YES at step S33), the reception unit 15 instructs the first image acquisition unit 13 to acquire a first image, and instructs the generation unit 16 to generate an association data piece in which the first image acquired in the first image acquisition unit 13 is associated with the content piece selected in step S32. Upon receiving the instruction from the reception unit 15, the first image acquisition unit 13 acquires an image that has been obtained by imaging and is being displayed on the screen when a pointing object is released from the screen. Upon receiving the instruction from the reception unit 15, the generation unit 16 associates the image (first image) acquired by the first image acquisition unit 13 with the content piece selected in step S32 to thereby generate an association data piece (step S34). Then, the writing unit 17 performs control for writing the association data piece generated in step S34 into the server device 20 (step S35).

Also in the second embodiment, the same effect as in the first embodiment can be obtained.

Modification 1 of Second Embodiment

Figure 15:
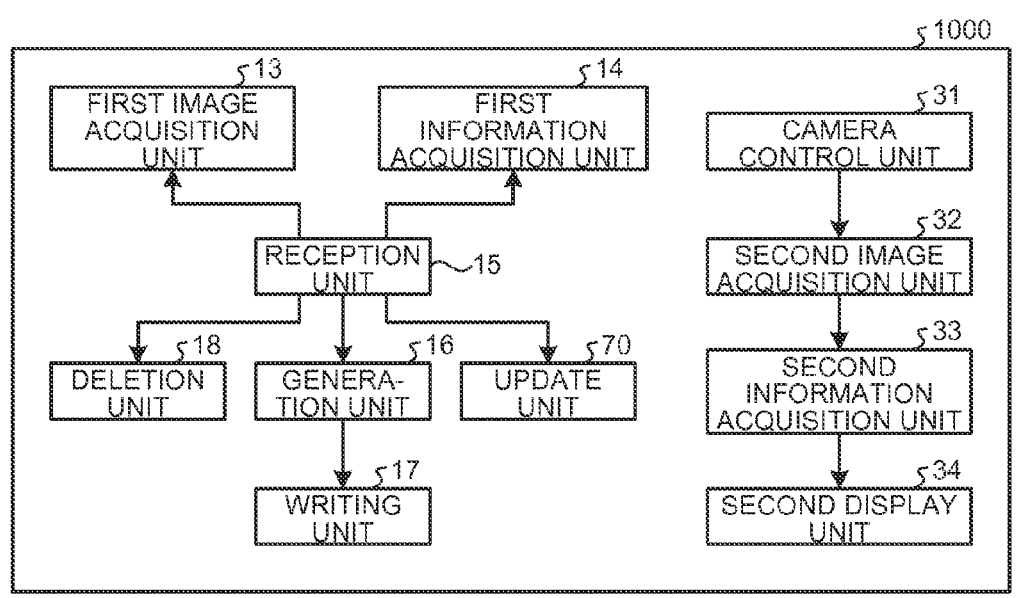
FIG. 15 is a diagram illustrating an example of the functional configuration of an information processing apparatus according to a modification.

For example, under the state that a superimposed image is displayed on the screen, when a new content piece is selected, the new content piece may be added to the registered association data. FIG. 15 is a block diagram illustrating an example of the functional configuration of an information processing apparatus 1000 according to Modification 1. As illustrated in FIG. 15, the image processor 1000 is different from the second embodiment in that the image processor 1000 further includes an update unit 70.

In the example illustrated in FIG. 15, when the reception unit 15 receives an input for instructing selection of any of multiple pieces of content that are displayed on the content area (corresponding to the first input described above), with a superimposed image displayed on the screen, the reception unit 15 instructs the first information acquisition unit 14 to acquire the content piece that has been instructed to be selected. Further, the reception unit 15 instructs the update unit 70 to update an association data piece (an association data piece registered in the server device 20) that corresponds to a content piece included in the superimposed image.

Upon receiving the instruction from the reception unit 15, the update unit 70 performs control for adding the content piece acquired in the first information acquisition unit 14 to the registered association data piece that corresponds to the content piece included in the superimposed image. As a result, the registered association data piece that corresponds to the content piece included in the superimposed image is updated into an association data piece in which the content piece included in the superimposed image, the newly selected content piece (the content piece acquired in the first information acquisition unit 14) and an image are associated with each other.

Modification 2 of Second Embodiment

For example, the first storage unit 22 and the second storage unit 24 may be provided within the information processing apparatus 100 without providing the server device 20.

Further, programs executed in the registration device 10, the terminal device 30 and the information processing apparatus 100 may be provided by being stored in a computer that is connected to a network such as the Internet, and causing the stored programs to be downloaded via the network. Furthermore, the programs executed in the registration device 10, the terminal device 30 and the information processing apparatus 100 may also be provided or distributed via a network such as the Internet. Moreover, the programs executed in the registration device 10, the terminal device 30 and the information processing apparatus 100 may also be provided by being previously embedded in a nonvolatile recording medium such as ROM.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   a hardware processor configured to control the apparatus to at least:
   acquire a first image obtained by imaging;
   acquire any of multiple pieces of information capable of being associated with the first image;
   receive a first input;
   associate the acquired first image with the acquired information piece to generate an association data piece when the first input is received;
   write the association data piece into storage; and
   control displaying of the first image and one or more pieces of the information, wherein
   the first input is an input based on: receiving selection by a pointing object with respect to a first area of a screen that includes an image area in which the first image is displayed and an information area in which one or more pieces of the information are displayed; detecting moving of the pointing object to the image area and then detecting releasing of the pointing object, and
   when the first input is received
      the first image displayed on the screen when the pointing object is released is acquired, and
      the information piece corresponding to the first area is acquired.

2. The apparatus according to claim 1, wherein
   the first input is an input based on: detecting the pointing object in contact with the first area of the screen; detecting moving of the pointing object to the image area while contact with the screen is maintained; and then detecting releasing of the pointing object from the screen.

3. The apparatus according to claim 2, wherein the hardware processor is further configured to control the apparatus to display the information piece displayed in the first area so as to follow a trajectory of the moving pointing object.

4. The apparatus according to claim 2, wherein
   the hardware processor is configured to control display of second images capable of identifying first images with which information pieces have already been associated, and
   when receiving a second input for selecting any of the second images, the hardware processor is configured to control the apparatus to acquire the first image, and generate an association data piece in which an information piece that corresponds to the second image that has been instructed to be selected is associated with the acquire first image.

5. The apparatus according to claim 1, wherein the hardware processor is further configured to control the apparatus to:
acquire a second image obtained by imaging;
acquire an information piece associated with a first image that matches the second image among first images contained in association data written into the storage; and
display a superimposed image of the second image and the acquired information piece associated with the matched first image.

6. The apparatus according to claim 5, wherein the hardware processor is further configured to control the apparatus to delete from the storage the association data piece in which the information piece included in the superimposed image is associated with the matched first image, in response to receiving a second input.

7. The apparatus according to claim 6, wherein
the second input is an input based on: detecting the pointing object in contact with a second area in which the information piece included in the superimposed image is displayed on a screen that includes an image area in which the superimposed image is displayed; detecting moving of the pointing object to outside the image area while contact with the screen is maintained; and then detecting releasing the pointing object from the screen, and
when receiving the second input, the hardware processor is further configured to control the apparatus to delete, from the storage, the association data piece in which the information piece included in the superimposed image is associated with the matched first image.

8. The apparatus according to claim 5, wherein, when a second input is received for instructing registration of an association data piece in which the information piece included in the superimposed image is associated with a newly acquired first image, the hardware processor is further configured to control the apparatus to generate an association data piece in which the information piece included in the superimposed image is associated with the newly acquired first image.

9. The apparatus according to claim 8, wherein the second input includes a third input for selecting the information piece included in the superimposed image and a fourth input for acquiring the new first image, and
the hardware processor is further configured to control the apparatus to select the information piece included in the superimposed image when receiving the third input, and then acquire the new first image and generate the association data piece in which the newly acquired first image is associated with the information piece selected in response to the third input when receiving the fourth input.

10. The apparatus according to claim 9, wherein
the third input is an input according to an operation of detecting a pointing object in contact with a second area in which the information piece included in the superimposed image is displayed on a screen that includes an image area in which the superimposed image is displayed, and
the fourth input is an input according to an operation of detecting releasing of the pointing object from the screen.

11. The apparatus according to claim 10, wherein, when the third input is received, the hardware processor is configured to control the apparatus to display the information piece included in the superimposed image so as to stick to the pointing object.

12. The apparatus according to claim 1, wherein, when the acquired first image matches or is similar to a first image contained in association data written into the storage, and when, among the information pieces contained in the association data written into the storage, the information piece associated with a first image that matches or is similar to the acquired first image matches the acquired information piece, the hardware processor is configured to control the apparatus to not generate an association data piece.

13. The apparatus according to claim 1, wherein
the hardware processor is configured to control the apparatus to display second images capable of identifying first images with which information pieces have already been associated, and
when receiving a second input for selecting any of the second images, the hardware processor is configured to control the apparatus to acquire the first image, and to generate an association data piece in which an information piece that corresponds to the second image that has been instructed to be selected is associated with the acquired first image.

14. An information processing method comprising:
acquiring, by a processor, a first image obtained by imaging;
acquiring, by the processor, any of multiple pieces of information capable of being associated with the first image;
generating, by the processor, an association data piece by associating the acquired first image with the acquired information piece when receiving a first input;
writing, by the processor, the generated association data piece into a storage unit; and
controlling, by the processor, of display of the first image and one or more pieces of the information, wherein
the first input is an input based on: receiving selection by a pointing object with respect to a first area of a screen that includes an image area in which the first image is displayed and an information area in which one or more pieces of the information are displayed; detecting moving of the pointing object to the image area and then detecting releasing of the pointing object; and
when receiving the first input,
acquiring the first image that is displayed on the screen when the pointing object is released, and
acquiring the information piece corresponding to the first area.

15. A computer program product comprising a non-transitory computer-readable medium containing a computer program embodied therein that, when executed, causes a computer to control an apparatus to at least:
acquire a first image obtained by imaging;
acquire any of multiple pieces of information capable of being associated with the first image;
receive a first input;
associate the acquired first image with the acquired information piece to generate an association data piece when the first input is received;
write the association data piece into storage; and
control display of the first image and one or more pieces of the information, wherein
the first input is an input based on: receiving selection by a pointing object with respect to a first area of a screen that includes an image area in which the first image is displayed and an information area in which one or more pieces of the information are displayed; detecting moving of the pointing object to the image area and then detecting releasing of the pointing object, and when receiving the first input, the first image that is displayed on the screen when the selection is released is acquired, and the information piece corresponding to the first area is acquired.

\* \* \* \* \*